United States Patent [19]

Lledos

[11] Patent Number: 5,271,318
[45] Date of Patent: Dec. 21, 1993

[54] FOLDING TABLE FOR A PRESS, WITH A SECURITY DEVICE TO CAUSE THE IMMEDIATE FALL OF THE TABLE IN THE CASE OF AN OVERLOAD

[76] Inventor: Manuel A. Lledos, C/Montseny 27, 08915 Barcelona, Spain

[21] Appl. No.: 929,298

[22] Filed: Aug. 13, 1992

[30] Foreign Application Priority Data

Aug. 14, 1991 [ES] Spain ............................ 9101895

[51] Int. Cl.$^5$ .............................................. B30B 15/28
[52] U.S. Cl. ........................................... 100/53; 72/1; 83/58; 425/154
[58] Field of Search ............... 100/53, 286; 72/1, 430; 83/58; 425/136-138, 154, 338

[56] References Cited

U.S. PATENT DOCUMENTS

| | | | |
|---|---|---|---|
| 1,749,545 | 3/1930 | Pierce | 100/286 X |
| 2,356,204 | 8/1944 | Birdsall | 72/430 X |
| 3,206,960 | 9/1965 | Moxley | 100/53 X |
| 3,761,212 | 9/1973 | Kontz | 425/154 |
| 3,825,385 | 7/1974 | Sesto | 425/137 |
| 4,206,699 | 6/1980 | Hemnmelgarn | 100/53 |

FOREIGN PATENT DOCUMENTS

| | | | |
|---|---|---|---|
| 468121 | 6/1914 | France | 100/53 |
| 2139955 | 1/1973 | France | 100/53 |
| 711748 | 8/1983 | U.S.S.R. | 100/53 |
| 1038258 | 8/1983 | U.S.S.R. | 100/53 |
| 1366423 | 1/1988 | U.S.S.R. | 100/53 |
| 1438968 | 11/1988 | U.S.S.R. | 100/53 |
| 1662870 | 7/1991 | U.S.S.R. | 100/53 |
| 777093 | 6/1957 | United Kingdom | 100/53 |

Primary Examiner—Stephen F. Gerrity
Attorney, Agent, or Firm—Felfe & Lynch

[57] ABSTRACT

A movable table 1 which rests on a mechanism with two upper parts 3 and two lower parts 4, situated on a fixed counter table 2 under which there is an electromagnet 6, which attracts a counter-weight 5 joined by way of bars 7 to a central ball-and-socket joint of an articulated safety mechanism in such a way that when the electromagnet 6 is disconnected the counter-weight 5 falls, the mechanism folds and the table 1 descends. Under the table 1 and the counter-weight 5, there exist some cylinders and stops 3, 11 which damp and limit the table's descent. The safety mechanism is housed in slots situated under the table 1 and on top of the counter table 2 and its central ball-and-socket joint is formed by the insertion of the lower shaft of the upper part of the mechanism in an upper half tube of the lower piece of the same mechanism.

6 Claims, 6 Drawing Sheets

FOLDING TABLE FOR A PRESS, WITH A SECURITY DEVICE TO CAUSE THE IMMEDIATE FALL OF THE TABLE IN THE CASE OF AN OVERLOAD

BACKGROUND OF THE INVENTION

The invention comprises a vertically mobile press table, guided at its ends by a guiding system, similar to that of a press carriage, supported from below onto an articulated mechanism which transmits the working force to a second table, called a counter-table, joined to the press frame and over which the articulated mechanism is supported. The system is maintained rigid by an electromagnet under the counter-table which attracts a counterweight attached to its ends, when an electric current is applied. Said counterweight passes through a slot in the middle of the counter-table and is supported by four adjustable bars at the ends of a central ball-socket of the articulated device.

Under normal working conditions, the system is rigid, but when an overload control coupled to the press, detects any anomalies, wearing or breakage of a jig, offshoots or loose pieces, overheating, defects in panel feeding etc., the electric current to the electromagnet is cut, the counterweight falls and, by means of the four adjustable bars at its ends, joined to the flanges of the central ball-socket, it drags the latter, the device folds, causing the table to fall such that the jig is removed from the reach of the press carriage, avoiding damage to the jig of the press.

Between the two tables and under the electromagnet run end stops and damper cylinders compensating the end stops, allowing return to the initial work position once the anomaly has been corrected.

Rapid precision presses are machines allowing pieces to be obtained by swiftly stamping, cutting and material deformation requiring the work to be developed by the pressure or impact of a mobile element, called the carriage, on the jig, supported by another element, called a table, which is generally part of the press frame.

For some decades these machines have been improved and perfected, especially regarding their guiding systems, lubrication and carriage traction, material feeding, tools, stamping and cutting molds and matrices which have allowed their speed and yield to be increased such that in some rapid mechanical precision presses working speeds of more than one thousand impacts per minute are obtained. The cutting and stamping tools, the molds and matrices or working jigs, have been perfected and high quality materials are produced, like special steels, ceramic materials, etc. and with great precision and complexity of shape, making them more and more valuable and given the speeds that any anomaly has to be solved, a loose screw or cutting, etc. could seriously damage them.

To prevent this damage, such as the nailing of the press, many presses are provided with overloading warnings systems and carriage movement breaking systems, but due to the speed at which the latter moves, especially in fast presses, and due to its own inertia, the carriage stops after several impacts, such that in many cases, the damage has already been produced due to the carriage reaching the stopping position.

SUMMARY OF THE INVENTION

The invention has been developed to prevent this damage or breakdowns from being produced in the jig or on the press due to the anomalies mentioned above, that can occur during the operation of the press.

The advantage of the invention of the folding table operated by an automatic safety device, is that the disconnection of the jig is immediate, due o the fall under the table, such that the jig is beyond the reach of the lower position of the carriage run.

The press tables should be rigid and of great strength; they should support the impacts the carriage produces over the jig and absorb all forces without deformations or vibrations. The invention has been developed taking into account the strains the table has to support and consequently all pieces are characterized for their great strength, giving the set a great rigidity free from vibrations or deformations that could affect the precision and efficient operation of the press.

BRIEF DESCRIPTION OF THE DRAWING

The invention is described below with relation to the accompanying drawings.

DESCRIPTION OF THE PREFERRED EMBODIMENT

Numerical references have been established to distinguish the various parts that form the assembly. These references correspond to the following parts breakdown list:

| Reference | Description | No. of Parts |
|---|---|---|
| 1 | Folding table | 1 |
| 2 | Fixed Table (counter table) | 1 |
| 3 | Upper part of the articulated mechanism | 2 |
| 4 | Lower part of the articulated mechanism | 2 |
| 5 | Counter-weight of the electromagnet | 1 |
| 6 | Electromagnet | 1 |
| 7 | Adjustable tie-rod | 4 |
| 8 | End-stop for end of table run | 2 |
| 9 | Cylindrical shock absorber with an upward end-stop on the axis | 4 |
| 10 | Cylinder of the counter-weight of the electromagnet | 2 |
| 11 | End-stop for the run of same | 4 |
| 12 | Fixing clamps (3, 4) for 1 and 2 | 5 |
| 13 | Screws for clamp | 16 |
| 14 | Fixing clamps for end of central ball-and-socket joint | 4 |
| 15 | Screws for fixing clamps for central ball-and-socket joint | 16 |
| 16 | Fixing clamp for end of adjustable tie-rod | |
| 17 | Screws for fixing clamp at the end of | 16 |

-continued

| Reference | Description | No. of Parts |
|---|---|---|
| | the adjustable tie-rod | |
| 18 | Guide strips at end of table | 8 |
| 19 | Guide shaft for carriage and tables | 4 |
| 20 | side inspection cover (control) | 2 |
| 21 | Table end-stop | 4 |

Figure 1:
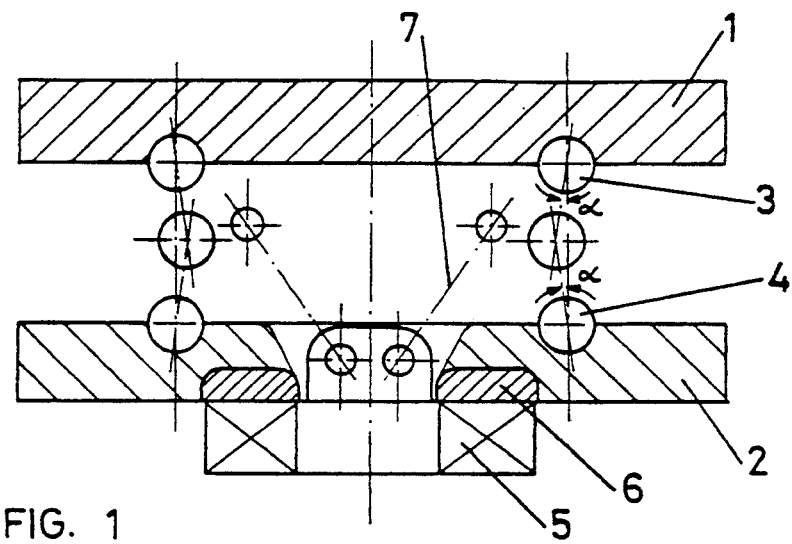
FIG. 1 represents schematically the device in a working position.

To sum up the apparatus invented, this comprises a mobile table 1 supported on the mechanism 3, 4 which in turn is supported by the fixed counter table 2, the electromagnet 6 that attracts the counter-weight 5 is under counter table 2, joined by rods 7 to the central ball-and-socket joint of mechanism 3, 4 (FIG. 1).

Figure 2:
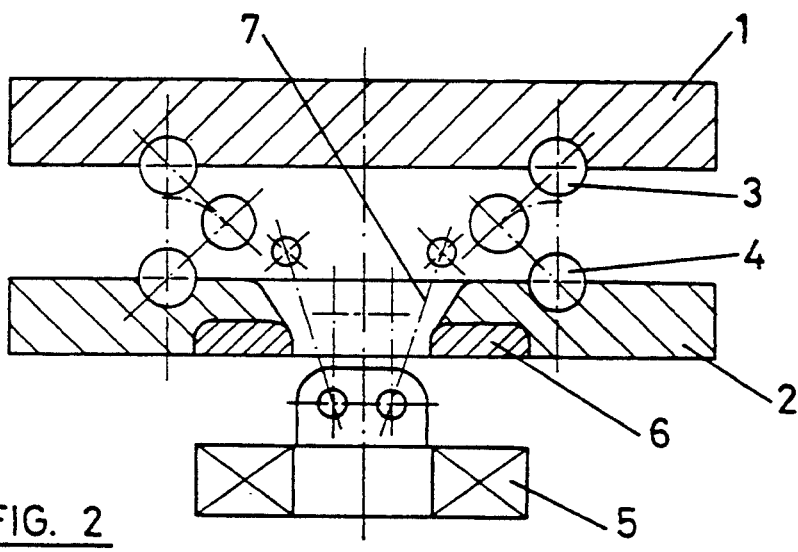
FIG. 2 represents schematically the device in a disconnected position.
Figure 3:
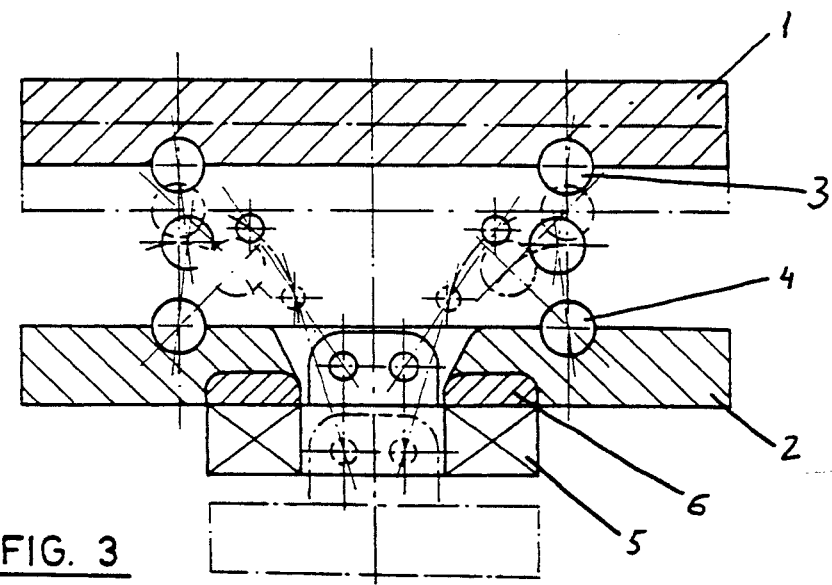
FIG. 3 represents schematically the device in two superimposed positions showing the functioning of the device schematically.
Figure 4:
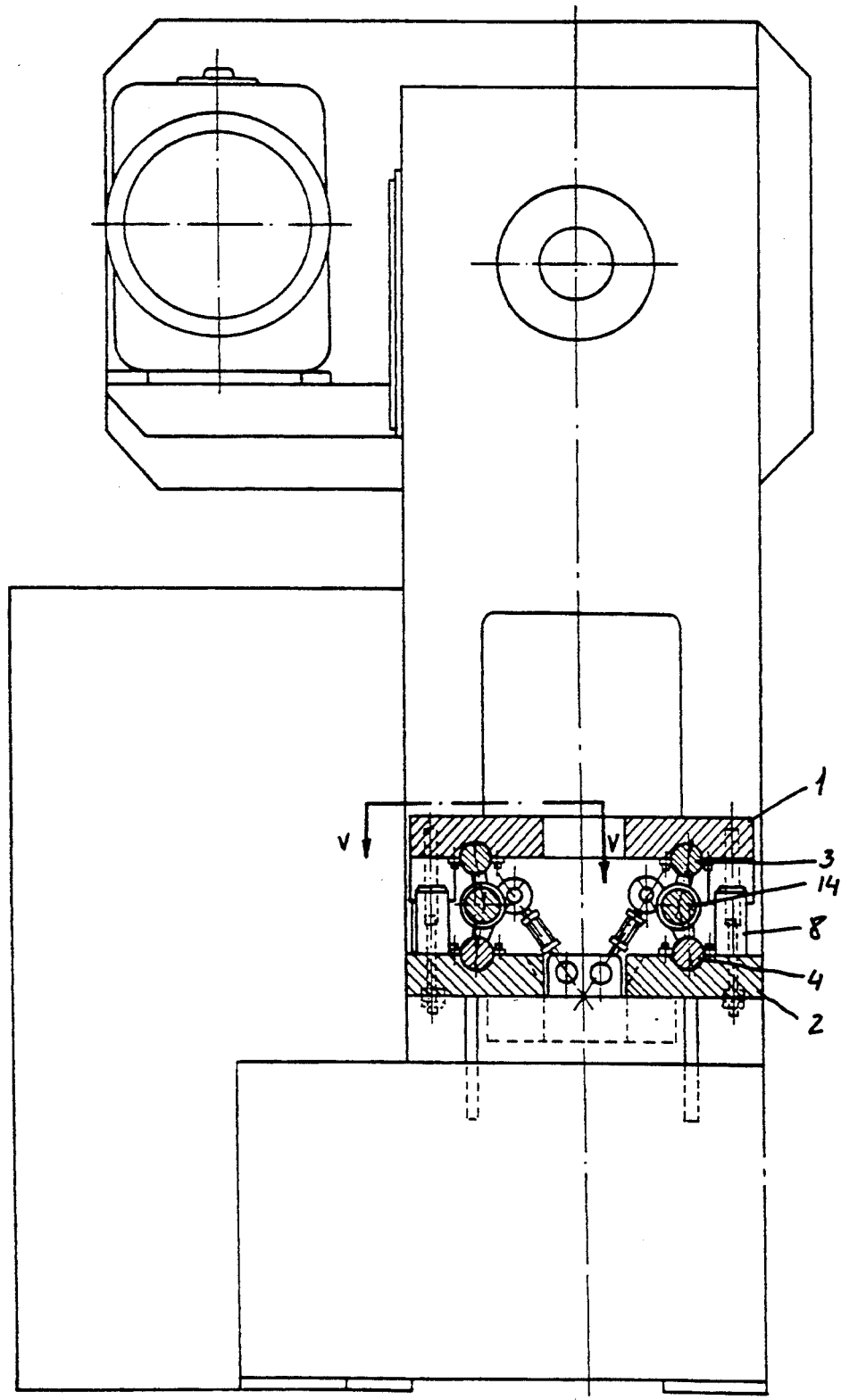
FIG. 4 represents the position of the device mounted in the press, seen in profile.

When an overload control disconnects the current from 6, the counter-weight 5 falls, and the mechanism 3, 4 folds and the table 1 falls (FIG. 2) disconnecting the tool.

Figure 5:
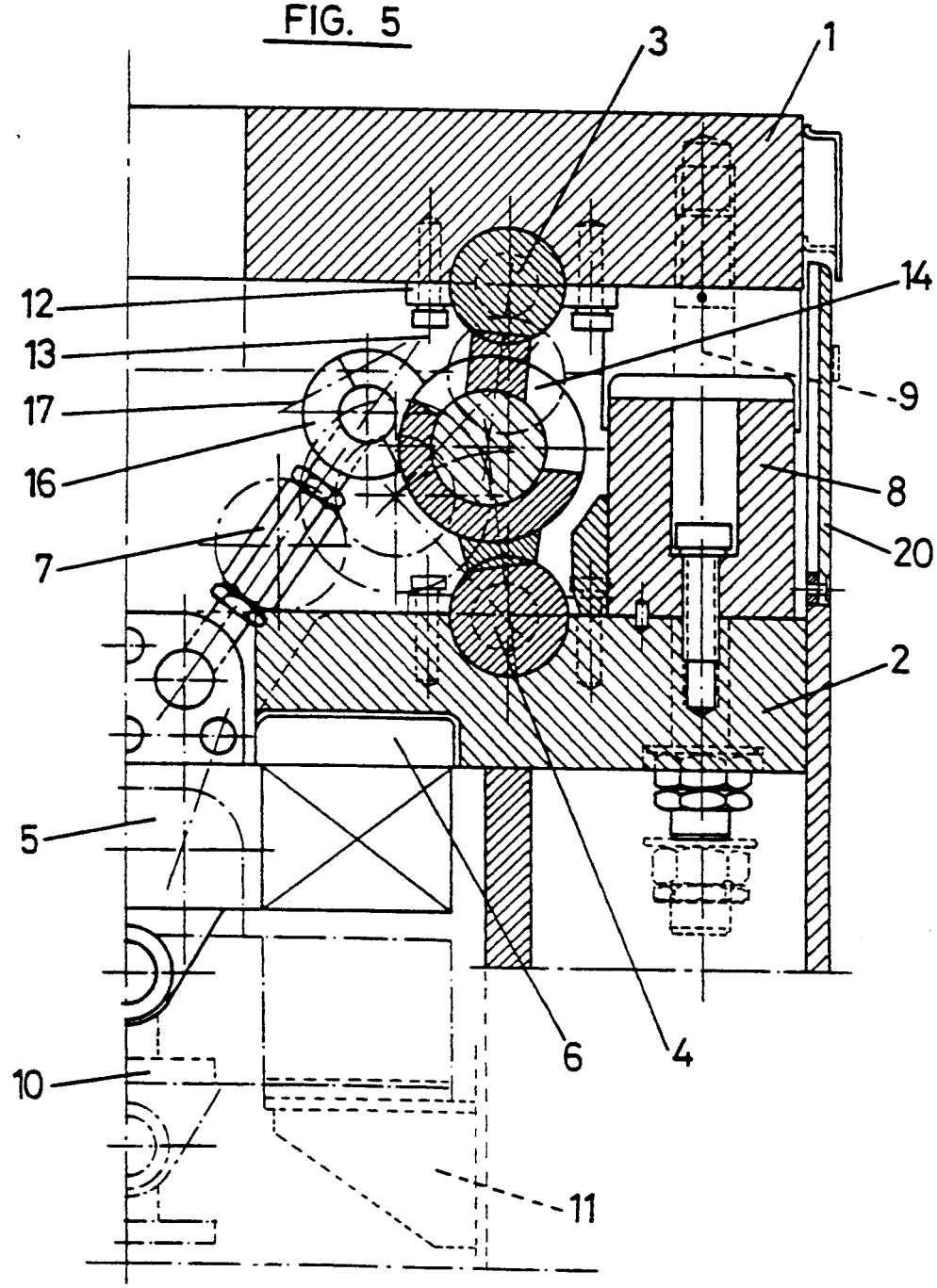
FIG. 5 represents Detail 'V' of FIG. 4 Section V—V of the device enlarged on its center and longitudinal axes.
Figure 6:
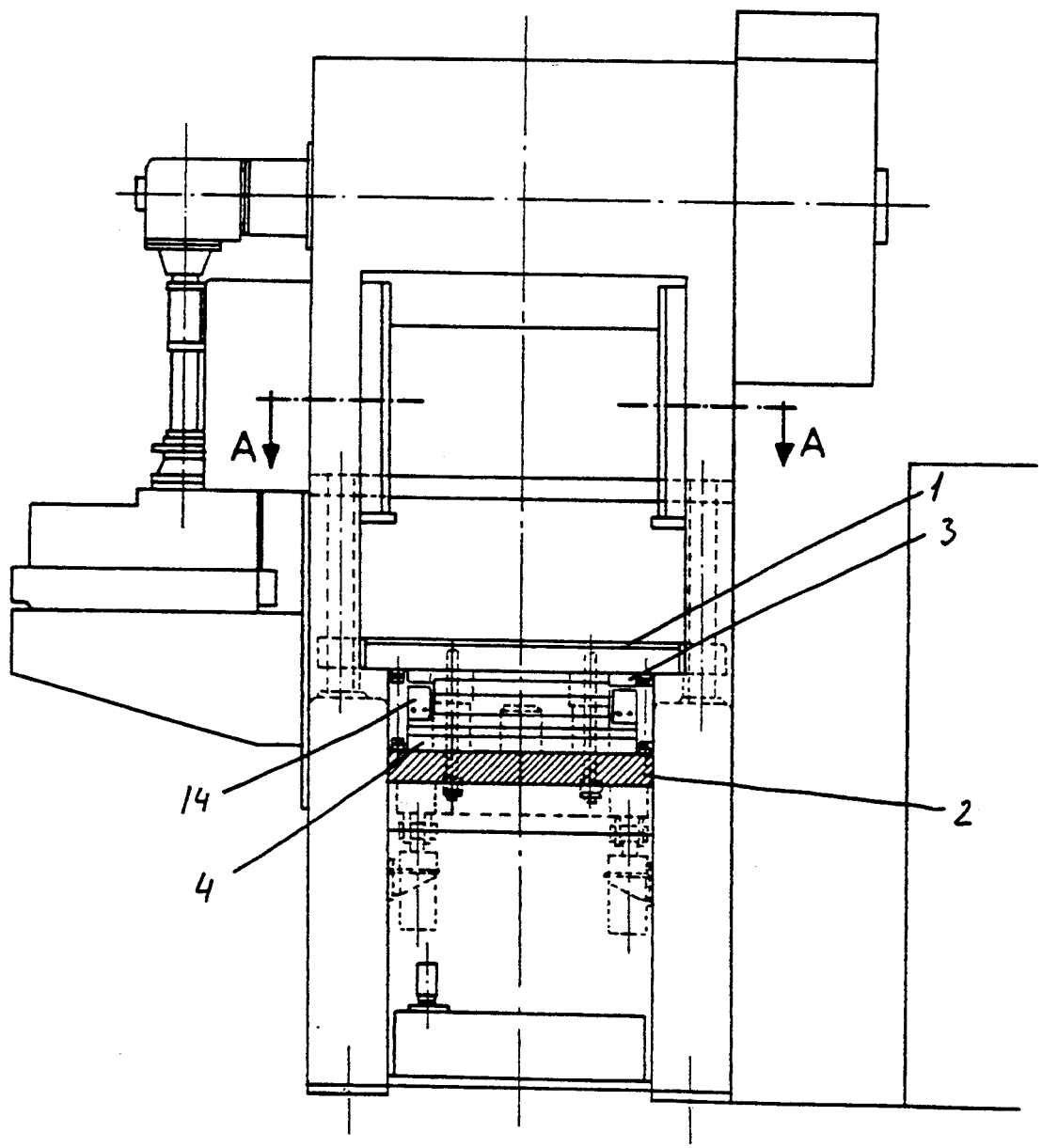
FIG. 6 represents the device for the vertical displacement of the table.

The cylinders 9, 10 and the stops 8, 11 under the table 1 and the counter-weight 5, respectively, (FIGS. 5, 7) absorb the shock and limit the travel of the table I and counter-weight 5 and returns them to the position of FIG. 1 having corrected the anomaly.

The mechanism 3, 4 is housed in semicircular slots under the table 1 and above counter table 2 respectively; its central ball-and-socket joint is formed by the insertion of the lower shaft of the upper part 3 of the articulated mechanism in the upper half-tube of the lower part 4 of the articulated mechanism and the shaft portion of parts 3, 4 must form an angle $\alpha > 0$ with the main shaft in the working position (FIG. 1).

In a more detailed description, referring to the Figs., the movable table 1 may be observed supported by its lower shaft of part 3, which comprises the upper part of the articulated mechanism. This part 3 is composed of two cylindrical shafts joined by a prismatic piece. The upper shaft is completely housed longitudinally and up to half its diameter, in a semi-circular slot located in the lower surface of the movable table 1 and is fixed to this at both ends by the two clamps 12 and four screws 13 which clamp it to the lower surface of the movable table 1, at each of its ends, by two protrusions whose diameters are less than that of the shaft. The lower shaft of this part 3 is housed up to half of its diameter in the upper portion of the lower part 4 which has the form of a half-tube and which fixes the lower shaft of part 3 by means of two clamps 14, each one fixed by four screws 15 and by the two protrusions of smaller diameter situated at each end of the lower shaft of part 3. The lower part 4 of the articulated mechanism is formed in its upper portion by a semi-tubular or semi-cylindrical piece in which is housed, up to half of its diameter, the lower shaft of the upper part 3, which is fixed by two protrusions of smaller diameter at both ends by means of the two clamps 14 and, in turn, each clamp is fixed by four screws 15. At the two ends of the upper portion of the lower part 4 of the articulated mechanism, there is another clamp 16, in the opposite sense to 14, which fixes the two ends of the upper portion of part 4 to the upper end o the adjustable tie-rod 7 which, in turn, joins the two ends of the counter-weight for the electromagnet 5. This part 4 and its lower portion are formed by a cylindrical shaft which is completely housed longitudinally up to half its diameter in a semi-circular slot located in the upper face of the table 2 and fixed to this by means of two clamps and the screws, two for each clamp, in the protrusions one at each of its ends, in a similar way to that in which the upper shaft of part 3 is fixed to the lower face of table 1 by clamps 12 and screws 13. The lower cylindrical shaft and the upper semi-tubular piece of this part 4 are joined by a trapezoidal prismatic piece along its whole length except at the protrusions.

Figure 7:
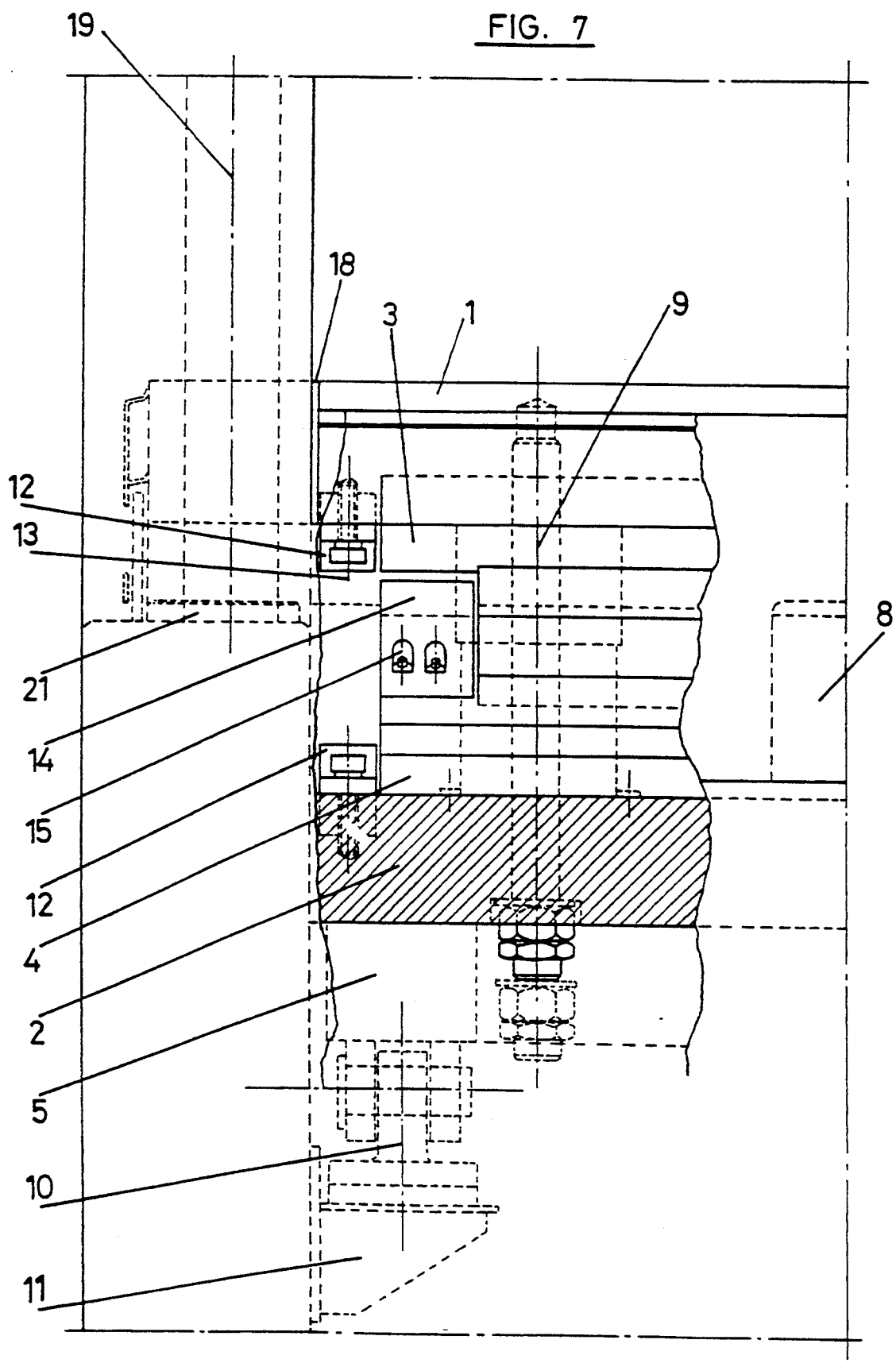
FIG. 7 represents in fragmentary view, to an enlarged scale, the device for the vertical displacement of the table.
Figure 8:
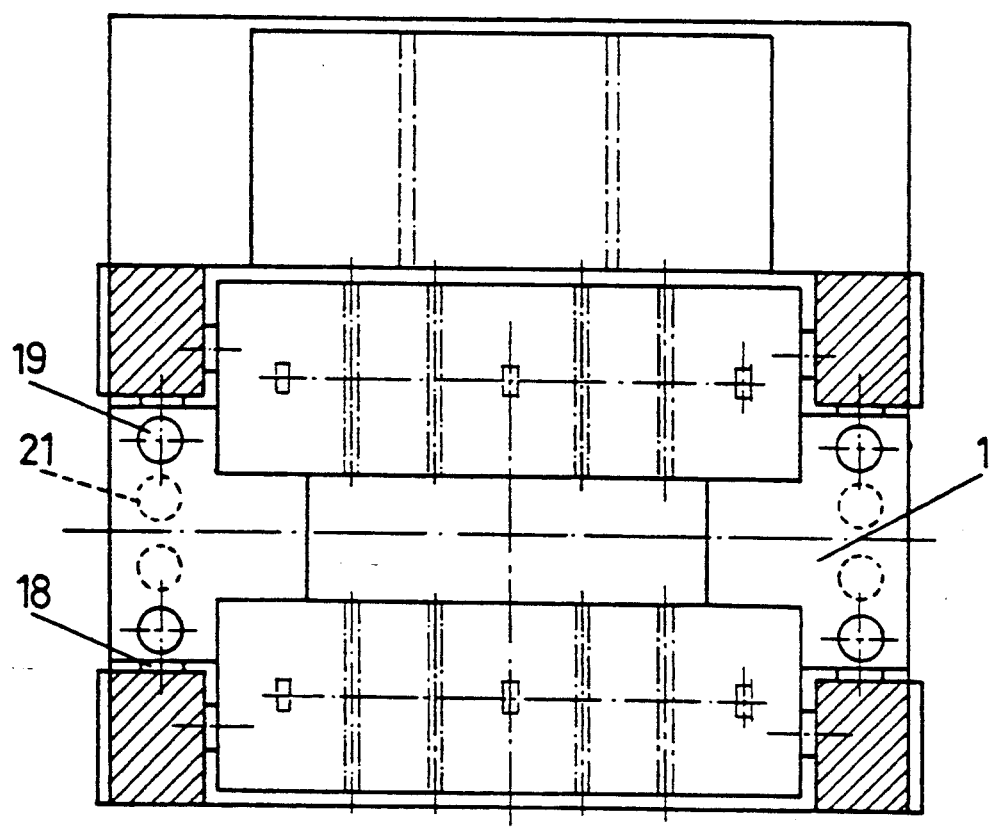
FIG. 8 represents the device for the vertical displacement of the table.

The movable table 1 is guided at its ends by the cylinders 19 and by the guides 18, both being fixed to the frame of the press, FIGS. 7 and 8. In its lower part it has the four threaded shafts 9 of the shock absorbing cylinders for the falling of the table and the elevators for raising it to its working position which have adjustable stops at the height of the table, at the other end. The two stops 8, situated in the center, and the four stops 21, at the ends, limit the lower position of the travel of the movable table 1.

Under the fixed counter table 2, there is an electromagnet 6 which attracts the counter-weight of the electromagnet 5, joined at its ends by means of the tie-rods 7 to the central ball-and-socket joint of the articulated mechanism 3, 4. In its lower part, the counter-weight 5 has the cylindrical shock absorbers for the falling of the counter-weight 10 and the elevators for the counter-weight for raising it to its working position 10, together with the fall limiting stops 11.

The safety device that provokes the falling of the table works in the following way:

In the working position (FIG. 1) a current flows through the electromagnet 6, which attracts and fixes the counter-weight of the electromagnet 5, and this is likewise fixed by means of the tie-rods 7, fixed at their ends and to the central ball-and-socket joint of the articulated mechanism. In this position the angle formed by the shafts of the upper parts 3 and the lower parts 4, with the main shaft of the articulated mechanism must be $\alpha > 0$, but as small as possible in order not to overload the electromagnet which might affect the rigidity of the assembly and never such that $\alpha = 0$ since this would block the device.

In this position, the device as a whole is maintained rigid. The forces produced by the blows from the carriage in the vertical sense on the tool fixed on the movable table 1, are transmitted via the articulated mechanism to the counter table 2, and from this to the frame of the press. The lateral forces are absorbed by the guide system of table 1 at its ends 18 and 19. As a result of the angle $\alpha$ a very small part of the force is transmitted through the tie-rods 7 to the electromagnetic assembly 6 and 5.

When an overload control device, adapted to the press, detects any anomaly, rough edges, failure to feed in the sheet metal, differences in thickness of the sheet metal, loose screws in the tool, in the press, etc. the current through the electromagnet 6 is switched off, which allows the counter-weight 5 (FIG. 2) to fall, which drags the central ball-and-socket joint of the articulated mechanism 3, 4 through the tie-rods 7, fixed to the clamp 16 of same. The articulated mechanism folds, taking with it the table 1, and the tool is immediately moved from the lowest point of the run of the carriage, avoiding damage to the tool and to the press. Once the anomaly is corrected, the shock absorbing and elevating cylinders 9 and 10 start to function, which raises the table 1 and the counter-weight for the electromagnet 5 to the working position. Current flows through the electromagnet 6 and production work in the press may be resumed.

Now that the invention has been described sufficiently, it should be stated that all those conditions of form and function which do not essentially alter the device may be varied, and therefore must remain protected by the patent applied for.

I claim:

1. A folding support mechanism for a press and being a security device which causes the immediate fall of a foldable table in the case of an overload, said support mechanism comprising a foldable table and a fixed counter-table, said foldable table being a vertically displaceable rectangular table (1), an articulated mechanism supporting said foldable table and formed by four main portions comprising two upper portions (3) and two lower portions (4) which are identical and symmetrically disposed with respect to a vertical center axis of said foldable table and said counter-table, one set of said portions (3) and (4) being to the right side of the axis, and the other set being to the left side of the axis, each upper portion (3) and each lower portion (4) having a central diameter and having a protrusion having a lesser diameter than the central diameter at each of the ends thereof, four semi-circular slots partially housing said portions up to half of the central diameter thereof, two of said slots being situated in the foldable table (1) and two being in the counter-table (2), clamps (12) and screws (13), said four slots being symmetrical with respect to the axis, and two of said portions being fixed to the foldable table (1) in the slots thereof and another two thereof being fixed to the counter-table (2) in the slots thereof by means of the clamps (12) and the screws (13) and by the protrusions on the ends of the portions, each upper portion (3) comprising a shorter lower shaft joined to said upper portion, each lower portion (4) having an upper part being in the form of a half tube having an interior chamber, the lower shaft of each upper portion (3) being housed up to half of its diameter in the interior chamber of the upper part of lower portion (4).

2. A folding support mechanism according to claim 1 in which the lower portion (4) of the articulated mechanism includes a lower shaft having an entire length and a trapezoidal prismatic portion in the form of a half tube joined to the lower shaft of the lower portion 4 by means of the trapezoidal prismatic portion throughout the entire length of said lower shaft except for protrusions.

3. A folding support mechanism according to claim 2 in which foldable table (1) is provided with cylindrical shock absorbers comprising four shafts (9) and elevators to raise the foldable table into its working position, said four shafts passing through openings in the counter-table (2).

4. A folding support mechanism according to claim 3 in which the articulated mechanism has at each end a central ball and socket joint fixed to the upper part of portion (4) in a form of a half tube, adjustable tie rods having ends, two clamps (16) fixing each of the ends of the adjustable tie-rods (7), a counter-weight (5) for an electromagnet (6) on the lower part of the counter-table (2), said tie-rods joining the central ball and socket joint to the ends of the counter-weight (5), said electromagnet (6) remaining in a working position fixed to the counter-table (2), said counter-weight (5) having a cylindrical shock absorber for the fall of table (1), and end stops (11).

5. A folding support mechanism according to claim 4 in which the counter-table (2) supports four cylindrical shock absorber elevators (9), two end stops (8) and the articulated mechanism, all of which, together with four table ends stops (21), limit the fall of table (1).

6. A folding support mechanism according to claim 5 in which, in the articulated mechanism, an angle $\alpha$ formed by two axes of the upper portions (3) and the lower portions (4) with a main axis of the articulated mechanism is greater than 0.

* * * * *